July 1, 1969 W. G. SPOHN 3,452,688
EXTRUSION APPARATUS
Filed May 1, 1967
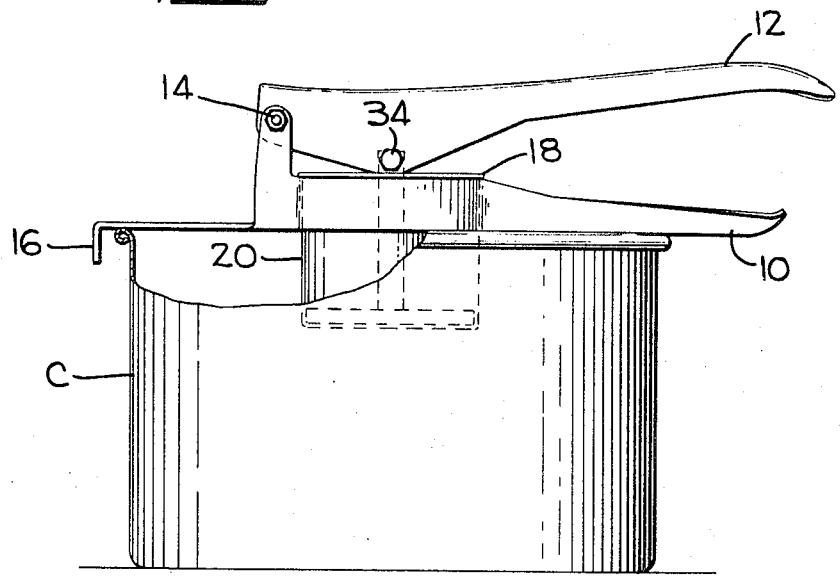
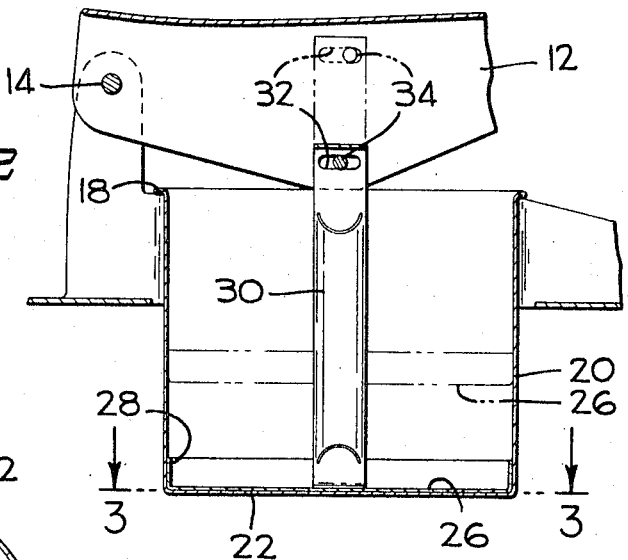
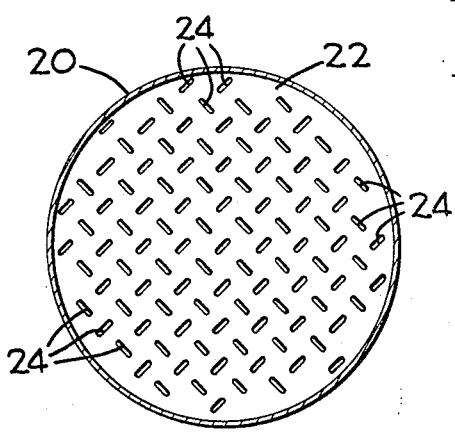
INVENTOR.
WALTER G. SPOHN
BY Paul B. File
PATENT AGENT United States Patent Office 3,452,688
Patented July 1, 1969

3,452,688
EXTRUSION APPARATUS
Walter G. Spohn, 1467 Gratel Lane,
Mountain View, Calif. 94040
Filed May 1, 1967, Ser. No. 634,970
Int. Cl. A21c 11/16, 11/18
U.S. Cl. 107—14                                2 Claims

ABSTRACT OF THE DISCLOSURE

Dough-extruding apparatus for making noodles or the like including a cup-shaped extrusion die with a perforated base portion through which dough within the die can be forced by manual manipulation of a handle connected to a pressure plate movably arranged within the cup-shaped die.

---

The present invention relates generally to extrusion apparatus and more particularly to apparatus for extruding edible paste or dough preparatory to cooking of same.

Noodles, spaghetti and other edible paste products are enjoyed by many individuals, but most commonly are purchased in dry form in a store, primarily because it is very inconvenient to form the extruded material from the raw dough or paste at home.

Since variations in the precise dough mixture can be selected at home and, in addition, since the raw extruded dough can be cooked rapidly, it is a primary object of the present invention to provide a simple extrusion apparatus which can be utilized at home to extrude the raw dough or paste directly into the cooking utensil.

It is a feature of the invention to provide an extrusion apparatus arranged to be mounted directly on the lip of the cooking utensil so that the dough can be extruded directly into the boiling water therewithin.

It is a further feature of the invention to provide an extrusion apparatus which can be operated easily and yet permit the extrusion of a sizable amount of dough therefrom.

It is yet another feature of the invention to provide an extrusion apparatus wherein the extrusion die is formed to provide appropriate separation of the extruded dough so as to effectively preclude subsequent agglomeration thereof.

It is yet another feature of the invention to provide an extrusion apparatus arranged to insure that all of the dough is directed through the extrusion die so that waste and messiness of the operation are avoided.

It is yet a further feature of the invention to provide an extrusion apparatus wherein the extrusion die itself is removably mounted to enable substitution of another die for formation of dough into various extruded shapes as desired by the user.

These as well as other objects and features of the invention will become more apparent from a perusal of the following description of the structure illustrated in the accompanying drawing wherein:

FIG. 1 is a side elevational view, partially broken away of a cooking utensil having an extrusion apparatus embodying the present invention mounted thereon preparatory to performing the extrusion operation, FIG. 2 is an enlarged central vertical sectional view through the extrusion apparatus indicating the operational characteristics thereof, and FIG. 3 is a horizontal, transverse sectional view taken along line 3—3 of FIG. 2 indicating the formation of one type of extrusion die that can be utilized in the apparatus.

With initial reference to FIG. 1, the illustrated extrusion apparatus includes a pair of handles 10, 12 which are joined by a pivot pin 14 at their ends for motion towards or away from one another. One end of the lower handle 10 is adapted to rest on the lip of a cooking utensil C and its remote extremity is extended and provided with a downwardly directed hook 16 which in use is arranged to depend downwardly beyond the opposite side of the cooking utensil, such handle thus forming a support for the entire unit enabling its proper positioning on top of the cooking utensil.

Centrally, the lower handle 10 is expanded into a cylindrical collar 18 for the removable reception therewithin of an extrusion die 20 having a generally cup-shaped configuration. The lip of the cup 20 is bent outwardly slightly so that it may rest on top of the collar 18 with the remainder of the cup projecting downwardly therethrough substantially centrally over the cooking utensil C when the handle 10 is seated thereon as illustrated in FIG. 1. The sides of the extrusion die 20 are imperforate but the lower base portion 22 thereof is perforated to provide the requisite extruded shape of the dough or paste material pressed through such perforations 24. As shown in FIG. 3, the perforations 24 constitute a plurality of narrow slots formed in the base 22 of the cup, these obviously being capable of forming noodle-like extrusions when the dough is pressed therethrough. It is to be observed that adjacent slots are mutually perpendicular and are spaced apart a distance at least equal to the length of the slots themselves. This particular arrangement and spacing of the slots assures separation of the noodle-like extrusions as they emerge from the base of the cup so the same will not immediately come into contact and agglomerate into a mass prior to the cooking process.

In order to force dough positioned within the cup 20 through the perforations 24 in its base 22, a pressure plate 26 is arranged for movement downwardly through the cup in the fashion best illustrated in FIG. 2. As there shown, the pressure plate 26 includes a flat, circular bottom portion whose exterior diameter is slightly less than the interior diameter of the cup so that a close but sliding fit therebetween is obtained. Preferably, as illustrated, the edge of the pressure plate 26 is provided with an upwardly bent cylindrical flange 28 which maintains the pressure plate in co-axial alignment with the cup during relative motion therebetween. Centrally, the pressure plate 26 has affixed thereto an actuating rod 30 which extends upwardly for connection to the previously mentioned upper handle 12. As shown in FIG. 2, the upper end of the actuating rod 30 is provided with a substantially horizontal slot 32 through which an actuating pin 34 projects, the ends of such pin being rigidly secured to the upper handle 12. When the upper handle 12 is manually moved, upwardly or downwardly, it will be obvious that this pin 34 moves about an arc centered at the mounting pivot 14 for the handle and the described slot 32 allows the transmission of motion between the handle 12 and the pressure plate rod 30 while, at the same time permitting the rod and the pressure plate 26 mounted at its lower end to retain its aligned co-axial relationship with the cup-shaped extrusion die 20.

In operation, the upper handle 12 is pivoted upwardly to withdraw the pressure plate 26 entirely from the cup-shaped extrusion die 20 and the latter is then filled with the previously prepared dough. The entire structure is then placed over a cooking utensil C having boiling water therein and the pressure plate 26 is moved downwardly through manual application of pressure on the upper actuating handle 12. Since the pressure plate 26, during its motion such as illustrated by the full line and phantom line dispositions in FIG. 2, is maintained in alignment with the cup 20, no material can escape around the sides of the pressure plate and all is forced through the perforations 24 of the cup-shaped extrusion die 20 and thence drops into the boiling water thereunder.

Dependent on personal preference, the dough can be extruded into a boiling broth, or into heated cooking oil to provide "fried" noodles, the apparatus thus adapting itself readily to various uses.

If different shapes of extruded dough are required, it is merely necessary to remove the cup 20 from its seat on the lower handle 10 and substitute another cup having the appropriate apertures therewithin. Such removal of the cup also facilitates cleansing thereof preparatory to subsequent use.

Various modifications and/or alterations in the structure as described can obviously be made without departing from the spirit of the invention and the foregoing description of one embodiment is to be considered as purely exemplary and not in a limiting sense and the actual scope of the invention is to be ascertained only by reference to the appended claims.

What is claimed is:
1. Apparatus for extruding dough or the like which comprises
   a cup-shaped extrusion die having imperforate side walls and a plurality of perforations in its base,
   a pressure plate having a peripheral flange arranged for close sliding movement within said die,
   a first handle removably supporting said extrusion die, and
   a second handle pivotally joined to said first handle and connected by a pin and slot connection to said pressure plate.
2. Apparatus for extruding dough or the like according to claim 1 wherein
   said first handle is adapted to rest on the lip of a cooking utensil and is arranged to support said extrusion die centrally over said utensil for discharge of extruded dough thereinto.

References Cited
UNITED STATES PATENTS

| 1,301,065 | 4/1919 | Kunst. | |
| 1,607,880 | 11/1926 | Dungan | 107—14.2 |
| 1,871,558 | 8/1932 | Redwitz | 107—14.6 |

FOREIGN PATENTS 116,582   9/1926   Switzerland.

ROBERT W. MICHELL, *Primary Examiner.*

JOHN M. BELL, *Assistant Examiner.*

U.S. Cl. X.R.

99—353, 403